US010938448B2

(12) United States Patent
Beunardeau

(10) Patent No.: US 10,938,448 B2
(45) Date of Patent: Mar. 2, 2021

(54) METHOD FOR PROCESSING DATA BY MEANS OF AN ELECTRONIC DATA-ACQUISITION DEVICE, CORRESPONDING DEVICE AND PROGRAM

(71) Applicant: INGENICO GROUP, Paris (FR)

(72) Inventor: Marc Beunardeau, Paris (FR)

(73) Assignee: INGENICO GROUP, Paris (FR)

( * ) Notice: Subject to any disclaimer, the term of this patent is extended or adjusted under 35 U.S.C. 154(b) by 210 days.

(21) Appl. No.: 15/656,502

(22) Filed: Jul. 21, 2017

(65) Prior Publication Data
US 2018/0026679 A1    Jan. 25, 2018

(30) Foreign Application Priority Data

Jul. 21, 2016 (FR) .................................... 16 56960

(51) Int. Cl.
*H04W 12/08* (2021.01)
*H04B 5/00* (2006.01)
(Continued)

(52) U.S. Cl.
CPC ....... *H04B 5/0056* (2013.01); *G06Q 20/3227* (2013.01); *G06Q 20/3278* (2013.01);
(Continued)

(58) Field of Classification Search
CPC ....... H04W 4/80; H04W 12/08; H04W 12/06; H04B 5/0056; H04K 1/003; G06Q 20/3227; G06Q 20/352; G06Q 20/3278
(Continued)

(56) References Cited

U.S. PATENT DOCUMENTS

| 2,292,387 A | * | 8/1942 | Markey ..................... H04L 9/38 380/34 |
| 5,144,666 A | * | 9/1992 | Le Van Suu ........... H04K 1/003 380/238 |

(Continued)

FOREIGN PATENT DOCUMENTS

| EP | 2574098 A1 | 3/2013 | |
| EP | 2833659 A2 * | 2/2015 | ........... H04B 5/0031 |

(Continued)

OTHER PUBLICATIONS

French Search Report dated Mar. 21, 2017 for corresponding French Patent Application No. 1656960, filed Jul. 21, 2016.
(Continued)

*Primary Examiner* — Saleh Najjar
*Assistant Examiner* — Khalid M Almaghayreh
(74) *Attorney, Agent, or Firm* — David D. Brush; Westman, Champlin & Koehler, P.A.

(57) ABSTRACT

A method for processing data by an electronic data-acquisition device, requesting to obtain data from an electronic data-providing device. The electronic data-acquisition device and the electronic data-providing device communicate with each other by using a short-range wireless (NFC) communications technology defining a transmission/reception reference frequency. The method includes the following acts performed by the electronic data-acquisition device: determining a frequency of transmission/reception of an interrogation signal that is different from the transmission/reception reference frequency, as a function of a frequency-determining parameter, delivering an interrogation frequency; and after determining the interrogation frequency, transmitting the interrogation signal to the data-providing device at the interrogation frequency.

12 Claims, 2 Drawing Sheets

Figure 1:
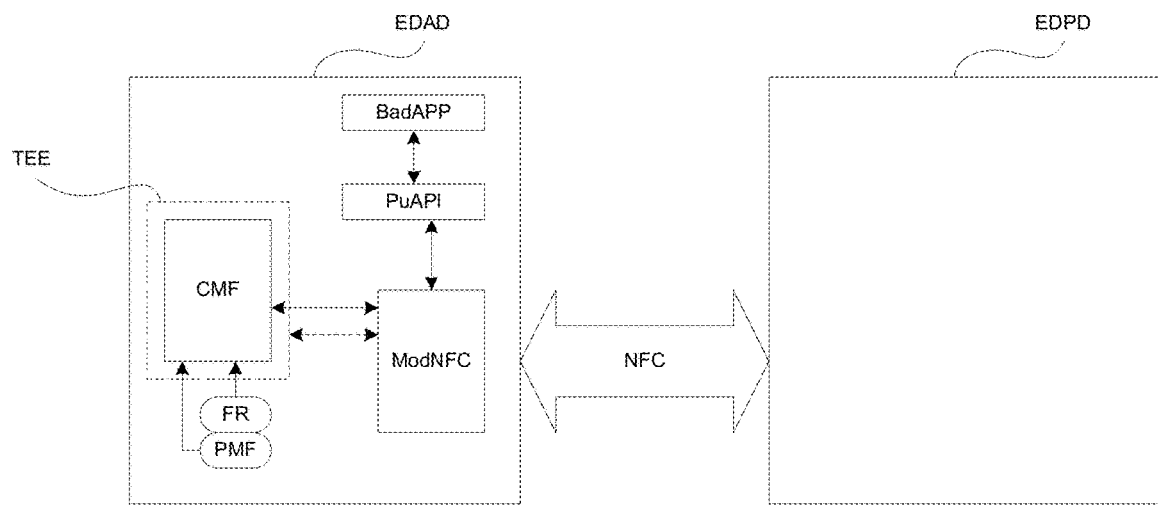

(51) Int. Cl.
  *G06Q 20/34* (2012.01)
  *G06Q 20/32* (2012.01)
  *H04K 1/00* (2006.01)
  *H04W 4/80* (2018.01)
  *H04W 12/06* (2021.01)

(52) U.S. Cl.
  CPC .......... *G06Q 20/352* (2013.01); *H04K 1/003* (2013.01); *H04W 4/80* (2018.02); *H04W 12/06* (2013.01); *H04W 12/08* (2013.01)

(58) Field of Classification Search
  USPC ...... 726/4, 14, 21–25, 27–30; 713/168–170; 709/203, 227, 228, 233, 248
  See application file for complete search history.

(56) References Cited

U.S. PATENT DOCUMENTS

| | | | | |
|---|---|---|---|---|
| 5,181,246 | A * | 1/1993 | Miki | H04K 1/003 380/34 |
| 6,342,844 | B1 * | 1/2002 | Rozin | G07B 15/063 340/928 |
| 8,126,806 | B1 * | 2/2012 | DiMartino | G06Q 20/105 705/41 |
| 2004/0127256 | A1 * | 7/2004 | Goldthwaite | G06Q 20/02 455/558 |
| 2013/0132282 | A1 * | 5/2013 | Shakkarwar | G06Q 20/2295 705/64 |
| 2013/0266141 | A1 * | 10/2013 | Kim | G06Q 20/4012 380/270 |
| 2013/0335199 | A1 * | 12/2013 | Jonely | G06K 7/10207 340/10.5 |
| 2015/0007310 | A1 * | 1/2015 | Truskovsky | H04W 12/0027 726/19 |
| 2015/0038074 | A1 * | 2/2015 | Buckley | H04W 12/02 455/41.1 |
| 2015/0257006 | A1 * | 9/2015 | Mashhadi | H04W 12/0806 455/41.2 |
| 2016/0261976 | A1 * | 9/2016 | Butler | H04B 5/0012 |
| 2017/0244823 | A1 * | 8/2017 | Kim | H04B 5/0037 |
| 2018/0020320 | A1 * | 1/2018 | Choi | H04W 76/14 |

FOREIGN PATENT DOCUMENTS

EP 2833659 A2 2/2015
FR 2652698 A1 4/1991

OTHER PUBLICATIONS

English Translation of Written Opinion dated Jul. 13, 2017 for corresponding French Patent Application No. 1656960, filed Jul. 21, 2016.

Anonymous, "Near Field Communication—Wikipedia, the free encyclopedia", Feb. 7, 2015 (Feb. 7, 2015), XP055275510.

Summons to attend Oral Proceedings from the European Patent Office dated Mar. 6, 2020 for corresponding EP Application 17182194.5.

* cited by examiner

METHOD FOR PROCESSING DATA BY MEANS OF AN ELECTRONIC DATA-ACQUISITION DEVICE, CORRESPONDING DEVICE AND PROGRAM

1. FIELD OF THE INVENTION

The present technique relates to the securing of data exchanged by means of a contactless data-transmission protocol. The technique relates more particularly to an NFC-type data transmission in which a transmission is made between a first device and a second device separated by a maximum distance of about 10 cm. The technique cannot be applied, and is not intended for application, in the context of Wi-Fi™, WiMax and LTE type data transmission techniques, for which the transmission technologies are different, and it is not intended for application to these techniques.

2. PRIOR ART

Many devices used in daily life are capable of communicating and exchanging data with each other. To this end, an increasing proportion of these devices use data-exchanging protocols called near-field communications protocols, or NFC protocols. Sometimes, these data-transmission techniques are also called RFID techniques. This name is incorrect since the abbreviation NFC stands for "near field communication" while RFID relates to "radio-frequency identification" means. Both systems use radio signals for all sorts of purposes of location and tracking, and occasionally replace barcodes. Both use short-range data transmission means.

Now, the use of this type of technology causes apprehension and raises questions on the part of users. Many users place little confidence or no confidence at all in these technologies, especially for use in processing personal and/or confidential data. This is the case for example with payment. Contactless payment devices have appeared relatively recently. These are for example contactless payment cards through which payment (the amount is generally limited) is made by placing the card on a compatible payment terminal or bringing it close to the terminal. These are also communications terminals which also integrate contactless chips: these contactless chips offer data-exchanging capacities to communications terminals, and these capacities can be used to make payments, somewhat as if the communications terminal were imitating the behavior of a contactless payment card.

There are many rumors, often baseless, suggesting that contactless communications or payments are unreliable. It is also often reported that these devices are unreliable in themselves and that the data contained in these devices can be retrieved without the user's knowledge or against his wishes. Although these rumors are often baseless, there are nevertheless risks during data transmission between the devices involved (cards, communications terminals, payment terminals) and especially during the transmission of payment data. The risks however do not arise out of the technology used per se but generally from the user himself. Thus, for example, in the case of a communications terminal using the NFC interface to make payment, it is possible that the user will have installed an unreliable application or even a malicious application aimed at using payment data for fraudulent purposes. The situation is the same with the merchant's terminal.

For example, in the case of a smartcard communicating its bank identifiers by NFC to a smartphone, the following problem arises: the pieces of data (transmitted by the card) are non-encrypted (because of a lack of computation capacity in the card). Thus, security in the case of classic contactless payment (between the contactless card and the payment terminal) relies on the fact that only the payment terminal "listens" to the data transmitted (in a near field) by the card. It is assumed that the terminal behaves honestly (it is secured and certified): in these classic scenarios, the payment terminal which processes the payment transaction is a secure device. It has been designed to prevent both hardware and software intrusions.

In the case of a smartphone, it is difficult to prevent a malicious application from being installed. For example, anybody can propose an application in an applications store, and although the application code is verified, it has been proven that malicious applications can be proposed. Once a malicious application is available in an applications store, it can be downloaded by any user of a smartphone compatible with this application.

The malicious application then has access to the commands proposed by the operating system of the communications terminal. Now, the operating systems of communications terminals offer an applications programming interface (API) that enables access to the applications data transmitted through the NFC interface of the communications terminal. The malicious application can then detect the start of an NFC data transmission and quite simply obtain data coming from a contactless payment card (for example the PAN of the card, the bearer's name, etc.).

This can also be the case for the communications terminal that transmits contactless payment data to a payment terminal: the example is the same as above, except that the malicious application intercepts the pieces of data when they are being transmitted (from the communications terminal to the payment terminal) and not when they are received by the communications terminal. To this end, the malicious terminal takes advantage of the fact that there is only one NFC chip present in the communications terminal and that the "sensitive" data coming for example from a (secured) trusted environment of the communications terminal travels all the same through the NFC interface and through the "standard" applications interface.

There is therefore a need to provide a solution to this problem that offers a securing of the data transmitted to the payment terminal (or to the communications terminal) even when there is a non-secured exchange of data.

3. SUMMARY OF THE INVENTION

The proposed technique does not entail these prior art problems. More particularly, it provides a simple solution to the problems identified here above. This solution is entirely compatible with existing devices and protocols. Unlike other solutions that could be proposed, this solution does not rely on an encryption of the data but on a more subtle modification of the transmission/reception of data between the payment means (contactless payment card, communications terminal) and the payment device (communications terminal, payment terminal).

More particularly, the invention proposes to modify the frequency at which the payment means is called upon to transmit payment data while at the same time implementing a particular mechanism, such as a secured applications interface, to process the signal received from the payment means.

The method implemented thus enables a legitimate application, entitled to carry out a payment, to obtain payment data transparently. The method implemented also prevents malicious applications from snooping on data transmitted to the legitimate application.

More generally, the invention relates to a method for processing data by an electronic data-acquisition device, requesting the obtaining of data from an electronic data-providing device, the electronic data-acquisition device and the electronic data-providing device communicating with each other by using a short-range wireless (NFC) communications technology defining a transmission/reception reference frequency. According to the present invention, such a method comprises, at the electronic data-acquisition device and prior to a step for transmitting an interrogation signal to said data-providing device, a step for determining a frequency of transmission/reception of said signal that is different from said transmission/reception reference frequency, as a function of a frequency-determining parameter, delivering an interrogation frequency.

Thus, a malicious frequency cannot obtain information by monitoring the reference frequency since this reference frequency is not used to transmit and receive data.

According to one particular characteristic, said step for determining frequency is implemented by a frequency-determining component of the electronic data-acquisition device, said frequency-determining component being under the exclusive control of a secured or trusted execution environment of said electronic device.

Thus, a malicious application cannot have access to the component and therefore cannot obtain knowledge of the response signal through this component.

According to one particular embodiment, said method comprises:
a step for receiving, by a frequency-determining component of the electronic data-acquisition device, a request for obtaining data;
a step for obtaining, by the frequency-determining component, the frequency-determining parameter;
the step for determining the transmission/reception frequency of said signal, as a function of the frequency-determining parameter, delivering the interrogation frequency;
a step for transmitting an interrogation signal to the electronic data-providing device at said interrogation frequency.

Thus, the modified frequency is not pre-encoded but depends on a frequency-determining parameter, the value of which can, for example, change in the course of time or can depend on a given index.

According to one particular embodiment, subsequently to the step for transmitting an interrogation signal the method furthermore comprises:
a step for receiving, from the electronic data-providing device, a response signal sampled at said interrogation frequency;
a step for obtaining a sequence of bits from said response signal, as a function of said interrogation frequency;
a step for converting said sequence of bits into a set of data;
a step for transmitting said set of data.

Thus, since the transmission of data in near-field technology leads (in passive response mode) to retransmission at the same frequency as the sending frequency, the received signal is also sampled at the interrogation frequency. This means that a malicious application snooping on the data transmitted at the "normal frequency" (typically 13.56 MHz) cannot perceive this response which is made at a frequency different from the reference frequency.

According to one particular characteristic, the step of reception, by the frequency-determining component of the electronic data-acquisition device, of the request for obtaining data, is at least partly implemented by a private applications interface and comprises a step for issuing an application authorization.

Thus, the access to the frequency-determining component is controlled: this means that a malicious application, which by definition is not authorized to call this private applications interface, cannot have access to the (transmitted or received) messages through the frequency-determining component.

The invention also relates to a method for processing data according to claim 5, characterized in that the step for issuing an application authorization comprises:
a step for obtaining a piece of data representing an applications identifier of the calling application, called an applications identifier;
an optional step for obtaining a piece of data representing a calling applications layer, called an applications layer identifier;
a step for determining an authorization for executing the determining component as a function of said applications identifier and/or said applications layer identifier.

Thus, depending on pre-set data, for example, data pre-set by the manufacturer of the interrogation device, a particular list of applications and/or a particular list of applications layers is defined as having access to the frequency-determining module.

According to one particular embodiment, the frequency-determining parameter is a multiplier factor.

The invention also relates to a method for processing data according to claim 7, characterized in that said multiplier factor has a value ranging from 1.1 to 1.8.

This range of values works with a majority of electronic data-providing devices.

According to one particular embodiment, the value of the multiplier factor is determined randomly, in a range of values from 1.1 to 1.8.

Thus, a malicious application cannot predict the value of the multiplier factor.

According to one particular embodiment, the value of the multiplier factor is determined by the component for determining at the reception of a request for obtaining data by contactless transfer.

Thus, the value of the multiplier factor cannot be deduced by a malicious application on the basis of prior observation because this value, which is decided at the time of reception of the request, is capable of changing at each transaction.

According to another aspect, the invention also relates to an electronic data-acquisition device comprising means for obtaining data from an electronic data-providing device, the electronic data-acquisition device and electronic data-providing device communicating with each other by using a short-range wireless (NFC) communications technology defining a transmission/reception reference frequency, the device comprising means for transmitting an interrogation signal to said data-providing device. Such a device comprises means for determining a frequency of transmission/reception of said signal, different from said transmission/reception reference frequency, as a function of a frequency-determining parameter, delivering an interrogation frequency.

More generally, such a device comprises means for implementing steps of the methods described above.

According to a preferred implementation, the different steps of the methods according to the invention are implemented by one or more software programs or computer programs comprising software instructions that are to be executed by a data processor of a relay module according to the proposed technique, these programs being designed to control the execution of different steps of the methods.

The invention is therefore also aimed at providing a program capable of being executed by a computer or by a data processor, this program comprising instructions to command the execution of the steps of a method as mentioned here above.

This program can use any programming language whatsoever and can be in the form of source code, object code or intermediate code between source code and object code such as in a partially compiled form or in any other desirable form whatsoever.

The invention is also aimed at providing an information carrier or medium readable by a data processor, and comprising instructions of a program as mentioned here above.

The information medium can be any entity or communications terminal whatsoever capable of storing the program. For example, the medium can comprise a storage means such as a ROM, for example, a CD ROM or microelectronic circuit ROM or again a magnetic recording means, for example a floppy disk or a hard disk drive.

Furthermore, the information medium can be a transmissible medium such as an electrical or optical signal that can be conveyed via an electrical or optical cable, by radio or by other means. The program according to the proposed technique can especially be uploaded to an Internet type network.

As an alternative, the information carrier can be an integrated circuit into which the program is incorporated, the circuit being adapted to executing or to being used in the execution of the method in question.

According to one embodiment, the proposed technique is implemented by means of software and/or hardware components. In this respect, the term "module" can correspond in this document equally well to a software component and to a hardware component or to a set of hardware and software components.

A software component corresponds to one or more computer programs, one or more sub-programs of a program or more generally to any element of a program or a piece of software capable of implementing a function or a set of functions according to what is described here below for the module concerned. Such a software component is executed by a data processor of a physical entity (terminal, server, gateway, router etc) and is capable of accessing the hardware resources of this physical entity (memories, recording media, communications buses, input/output electronic boards, user interfaces etc).

In the same way, a hardware component corresponds to any element of a hardware assembly capable of implementing a function or a set of functions according to what is described here below for the component concerned. It can be a programmable hardware component or a component with an integrated processor for the execution of software, for example, an integrated circuit, smart card, a memory card, an electronic board for the execution of firmware etc.

Each component of the system described here above can of course implement its own software components.

The different embodiments mentioned here above can be combined with one another to implement the proposed technique.

4. FIGURES

Figure 2:
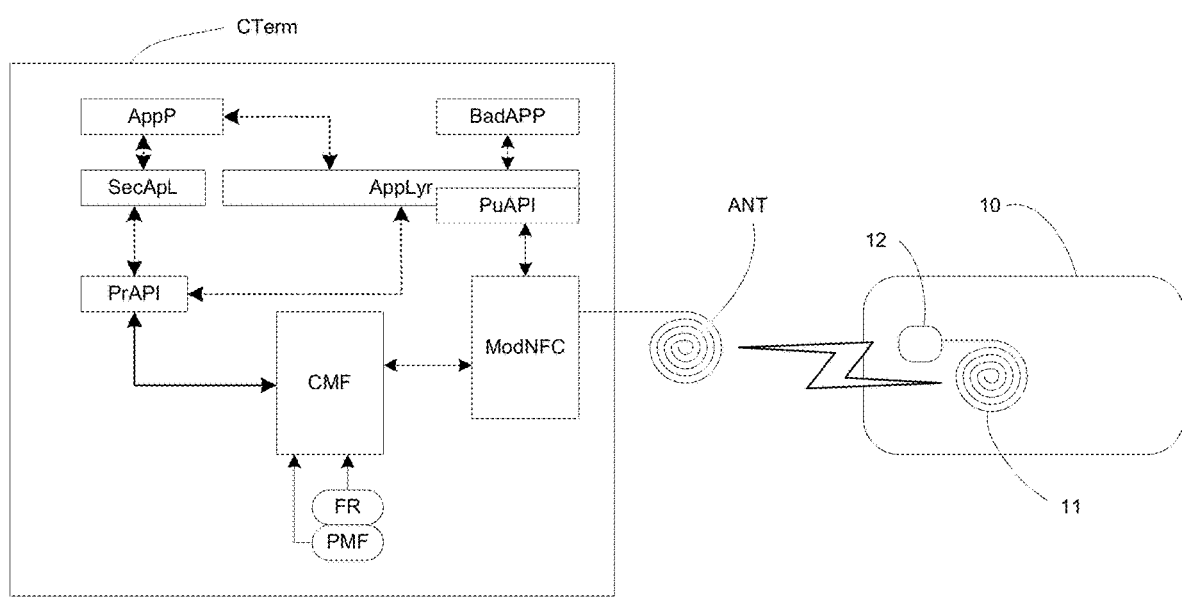
Figure 3:
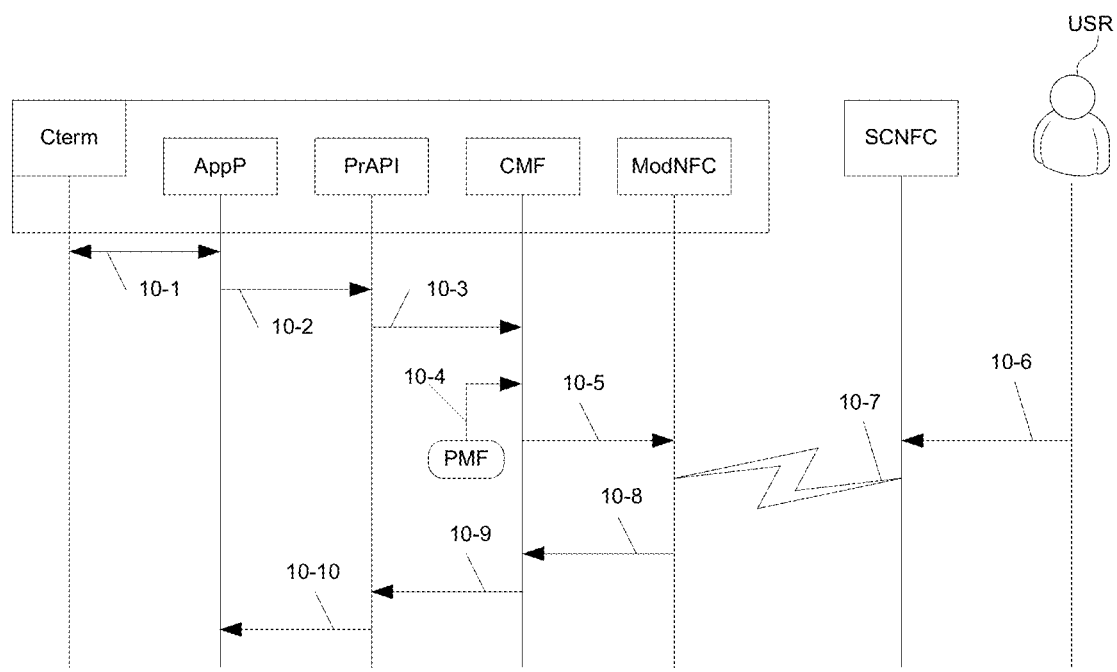
Figure 4:
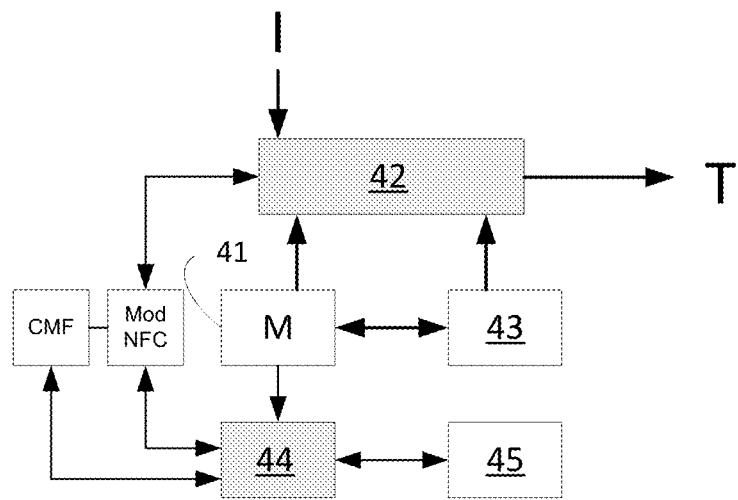

Other features and advantages of the invention shall appear more clearly from the following description of a preferred embodiment, given by way of a simple illustratory and non-exhaustive example and from the appended drawings, of which:

FIG. 1 is a block diagram of the proposed technique;

FIG. 2 presents an embodiment applied to a communications terminal seeking to obtain data from a payment card;

FIG. 3 describes an implementation of the data-processing method in the embodiment of FIG. 2;

FIG. 4 describes a communications terminal modified to implement the proposed technique.

5. DESCRIPTION

5.1. General Principle

As indicated above, the proposed technique resolves the problems of the prior art. More particularly, the proposed technique can be used to counter fraudulent espionage carried out by a malicious application.

The proposed technique provides a solution for communicating secret data, through the use of an NFC antenna, in a non-secured environment. FIG. 1 presents the general principle of the proposed technique.

More particularly, it is proposed to modify the frequency at which an electronic data-acquisition device (EDAD) requests the obtaining of data from an electronic data-providing device (EDPD), the electronic data-acquisition device (EDAD) and the electronic data-providing device (EDPD) communicating with each other by means of a wireless short-range (NFC) communications technique defining a transmission/reception reference frequency (for example 13.56 MHz). The interrogation frequency is determined on the basis of a frequency-determining parameter (PMF) and of the reference frequency (FR) by a determining component (CMF). The determining component (CMF) modifies the frequency at which the NFC module (ModNFC) transmits the NFC signal. Depending on the embodiments, the (interrogation) frequency-determining step consists of the application of a modification of the frequency so as to carry out the interrogation at a frequency lower than or higher than the reference frequency. The interrogation frequency is therefore not the reference frequency but a frequency different from the reference frequency and the frequency-determining parameter (PMF) is used to determine this frequency.

Depending on the embodiments and on operational constraints, the frequency-determining component (CMF) can be under the exclusive control of a secured or trusted execution environment (TEE) of said electronic device. This means that only this trusted environment (which can be a secured module of the electronic device) is capable of using the frequency-determining component.

Besides, to ensure secured access to the frequency-determining component, an authorization control mechanism is implemented. In this mechanism, only certain applications (which are executed within the electronic data-acquisition device) or certain applications layers are capable of using the frequency-determining component. The decision to access is for example implemented by the secured environment on the basis of a list of authorized application identifiers and/or authorized application layers. The authorized applications and/or authorized application layers are for example determined when setting the parameters of the electronic device, in the form of an internal database (of the flat file or XML file type for example). The access and/or the transmission of a request for obtaining data to the frequency-determining device is typically implemented by means of a private applications interface, which enables data to be requested. The frequency-determining component acts as an intermediary (for determining an interrogation frequency) between the private applications interface and the (classic) NFC module which will effectively build and transmit the signal (on the basis of the frequency). The frequency-determining component is therefore used not only to modify the transmission frequency of the signal but also to decode the response signal received and to convert this signal into a sequence of bits: it is therefore a gateway component. This mechanism comprises:

a step for obtaining a piece of data representing an applications identifier of the calling application, called an application identifier; and/or a step for obtaining a piece of data representing a calling application layer, called an application layer identifier;

a step for determining an authorization of execution of the determining component as a function of said application identifier and/or said application layer identifier.

With this technique, a malicious application (BadAPP) installed in the electronic data-acquisition device (EDAD) cannot access the data effectively received by the frequency-determining component (CMF). At best, this malicious application (BadAPP), using a public applications interface PuAPI, can access decoded data from the NFC module (ModNFC). Now, since this module is configured to process the signal that it receives at a reference frequency, it is not capable of processing a signal with a higher frequency.

Here below, a description is provided of an embodiment in relation to the obtaining of payment data through a user's communications terminal. It is clear that the embodiment that follows is given by way of an illustration and that the techniques in this embodiment can be combined together or singly in order to adapt to operational conditions of payment that may vary, such as for example transfers of files between two terminals or the obtaining of data other than bank data.

5.2. Description of One Embodiment

In this embodiment, the proposed technique can be applied for example to smartphone-to-smartphone communications (the smartphone being a tablet or other similar device), smartphone-to-payment terminal communications, smartcard-to-smartphone communications etc. This embodiment enables the communication for example of bank identifiers from a (payment) card to the smartphone by using NFC equipment, even when a malicious application installed in the smartphone is capable of calling application interfaces provided by the operating system, making it possible to listen to NFC communications. The embodiment also removes the need for cryptographic encryption on the part of the emitter (for example the payment card).

To achieve these results, the general principle consists of the application of a frequency modulation. More specifically, instead of using a standardized interrogation frequency (for example 13.56 MHz), the payment device interrogates the payment means at a higher frequency (for example 15.60 MHz). This interrogation frequency is the frequency at which the request for obtaining bank data is transmitted by the payment device to the payment means. The inventors have indeed noted that a controlled increase in the interrogation frequency of the payment means does not necessarily have an impact on the capacity of the payment means to respond to the request transmitted.

To understand the basis of the technique proposed by the inventors, it is necessary to refer to the functioning of an NFC payment means, such as a payment card for example.

An NFC payment card comprises a printed circuit. This printed circuit is used to carry out a data-processing operation. As a rule, the data-processing operation consists in responding, according to a particular data-exchanging standard, to one or more commands received from the payment terminal. To receive these commands, the printed circuit is connected to an antenna. This antenna (which generally cannot be seen and is placed in the substrate of the card) has two functions: the first function is to transmit a piece of date (a command) to the processor so that this data can be processed. The second function is to power the printed circuit so that it can carry out the requisite processing operations. Thus, an NFC payment card comprises an antenna and a signal converter associated with the printed circuit. The antenna perceives the (alternating) signal sent out from a distance by the payment device and the converter converts this signal firstly into a direct current which powers the chip and secondly into an alternating current called a clock signal current which serves to synchronize the exchanges between the chip and the payment device in the course of time.

To resolve the security problems posed by the prior art, the inventors have had the ingenious idea of increasing the frequency of the alternating signal transmitted (in proportions that depend on the hardware) by the payment device (and received by the payment means) while at the same time preserving the data reception, processing and transmission functions of the payment means.

To secure the process, the inventors have defined a novel software and/or hardware modulation component implanted within the payment device. Ingeniously, this software and/or hardware modulation component is used on the one hand to modulate the frequency of the clock signal of the NFC data transmission/reception module (NFC module) and, on the other hand, to process and decode the data received (i.e. the data received by means of the NFC module). Typically, the multiplier factor for the frequency ranges from 1.1 to 1.8. Other values can be implemented, depending on need and on the hardware architecture. The determining component therefore uses a frequency of 1.1 to 1.8 times the standard near-field transmission frequency which is 13.56 MHz, giving a frequency ranging from 14.916 MHz to 24.408 MHz. In a complementary way, it is also possible to reduce the transmission frequency if the multiplier factor is smaller than 1. Typically, a multiplier factor ranging from 0.7-0.9 can be applied.

One embodiment is presented with reference to FIG. 2.

An NFC payment means (10) (for example a card) comprises an NFC antenna (11) which is connected to a printed circuit (12). A payment device (CTerm) (for example a smartphone) comprises an NFC module (ModNFC) and is connected to a transmission/reception antenna (Ant) and a layer called an applications layer (AppLyr).

In normal operation (for example a file-exchanging operation), the applications layer (AppLyr) makes use of a public applications interface (PuAPI) to transmit and receive data from the NFC module (ModNFC).

An applications layer is defined as a set of hardware and/or software units that can have access to data coming from one or more "lower" layers, i.e. layers (stacked or not stacked) that directly or indirectly process the physical signals travelling through hardware components of the device (here it is a payment device). The access, through an applications layer, to the data is obtained by means of an applications interface which, in a way, acts as a gate providing access to data coming from a lower layer. Several applications layers can be stacked on one another, as defined for example in the OSI module where network protocols are concerned.

In alternating operation according to the present technique (for example operation to implement payment by means of a payment application (AppP), a determining component (CMF) modifies the data transmission/reception frequency of the NFC module (ModNFC). To this end, the determining component (CMF) applies a pre-determined modification parameter (PMF) to the NFC module (ModNFC). The application of this parameter leads to an increase (or decrease) of the transmission frequency as explained above. At the reception of the data, the determining component (CMF) retrieves the signal coming from the NFC module and converts this signal to obtain the decoded data at the parametrized transmission frequency. The determining component (CMF) has access to a private applications interface (PrAPI) which is used to transmit the data from the determining component (CMF) to the applications layer (AppLyr) or to a secured applications layer (SecApL).

According to this general embodiment, the private applications interface (PrAPI) is accessible only to the determining component (CMF) and/or, alternatively or cumulatively, accessible to the secured applications layer (SecApL) or to certain applications of the applications layer (AppLyr).

Referring to FIG. 3, we describe an embodiment illustrating the processing of a payment transaction that implements the technique and the components described above.

A user (USR) wishes to carry out a payment transaction with his communications terminal (CTerm) provided with an NFC interface. To make this payment, the user will place his payment card (SCNFC) on the communications terminal (CTerm). However, beforehand, the following method is implemented:
  a payment application (AppP) is opened (10-1) (either by the user (USR) himself or by a merchant's application, pre-installed on the communications terminal; the user wishes to make a purchase from the merchant);
  the payment application (AppP), for example after having displayed the contactless payment logo on the screen of the communications terminal (CTerm), transmits (10-2) a request, through the private applications interface (PrAPI), for obtaining data by contactless transfer; this request is transmitted (10-3) to the determining component (CMF);
  the determining component (CMF) obtains (10-4) a determining parameter (PMF) which it then uses to determine the interrogation frequency and transmit (10-5) a request, to the NFC module (ModNFC), for obtaining data by contactless transfer according to the pre-determined protocol and at an interrogation frequency depending on the determining parameter (PMF).
  When the user sees that the contactless payment logo is displayed, the user places (10-6) his payment card on the communications terminal. The card receives the signal coming from the communications terminal and the data from the card is transmitted (10-7), after processing if necessary, in the form of a response signal to the NFC module (ModNFC) of the communications terminal.
  the determining component (CMF) obtains (10-8) the signal received from the NFC module (ModNFC) and decodes it at the interrogation frequency:
  the determining component (CMF) transmits (10-9) the decoded data, through the private applications interface (PrAPI) (10-10), to the payment application (AppP) which can use the data to carry out or finalize the payment transaction.

There are several advantages to this implementation. First of all, the interrogation frequency modifies the received signal. The signal is therefore hard to interpret for any snooper devices (i.e. any additional devices in the neighborhood which could try to intercept data). In addition, since the frequency depends on a modulation parameter (which can be variable for a given device), the fact of knowing a frequency does not enable the present technique to be subverted. It must also be specified that this parameter can be obtained randomly or pseudo-randomly in a given range of parameters: for example a random value in a range of 1 kHz, 10 kHz or 100 kHz.

In addition, the proposed architecture and method offer an advantage from the viewpoint of the malicious application (possibly installed in the communications terminal). Indeed, the proposed technique makes it possible to thwart this application if there is one: the malicious application, when calling the public applications interface, obtains wrong data from the NFC module. Indeed, since the public applications interface is not informed about the determination of the interrogation frequency, it tries to convert the signal according to a standard frequency. Now, such an attempt is doomed to failure and causes the transmission or either wrong data or errors to the malicious application.

5.3. Other Features and Advantages

Referring to FIG. 4, we describe a communications terminal implemented to carry out data transmission in the context of a process of payment, according to the method described above.

For example, the communications terminal comprises a memory 41 constituted by a buffer memory, a general processor 42, for example a microprocessor, and managed by a computer program 43 and a secured memory 44, a secured processor 45 (TEE for example) managed by a computer program, these processors implementing the methods of processing and transmission/reception of data as described above to carry out the processing of data intended for and coming from a contactless interface.

At initialization, the code instructions of the computer program are for example loaded into a memory and then executed by the secured processor 45. The secured processor 45 inputs (through a software or hardware interface) at least one request for obtaining data by contactless transfer, this data coming, for example, from the general processor 42. The secured processor 45 implements the steps of the data transmission method, according to the instructions of the computer program to obtain (at a pre-defined frequency) one or more signals coming from a contactless payment means. These signals are converted into pieces of data that are transmitted to the general processor 42. The general processor 42 processes these pieces of data, for example to carry out a payment transaction.

To this end, the communications terminal comprises, in addition to the buffer memory 41, communications means such as network communications modules, data-transmission means and circuits for transmitting data between the different components of the communications terminal.

These means can take the form of a particular processor implemented within the communications terminal. According to one particular embodiment, this device implements a particular application which is in charge of carrying out transactions. This application is for example provided by the manufacturer of the processor in question in order to enable the use of said processor or it is provided by a payment solutions provider for "open" terminals. To this end, the processor comprises unique identification means. These unique identification means ensure the authenticity of the processor.

As indicated, the communications terminal comprises near-field communications means known as NFC communications means (ModNFC) and means for transmitting and receiving data coming from the communications networks. These means also take the form of communications interfaces used to exchange data on communications networks, interrogation means and means for updating databases. More particularly, the near-field communications means can be configured to transmit and receive data according to the transmission/reception frequency, this frequency being possibly modulated (from one transmission to another) according to a modulation parameter, this modulation parameter being defined either by the secured processor (when it exists) or by means of a secured or trusted environment (TEE) depending on the operating system of the communications terminal and being accessible by means of a determining component (CMF).

The invention claimed is:

1. A method for processing data by an electronic data-acquisition device, requesting to obtain data from an electronic data-providing device, the electronic data-acquisition device and the electronic data-providing device communicating with each other by using a short-range wireless communications technology defining a transmission/reception reference frequency, wherein the method comprises the following acts:
   the electronic data-acquisition device determining, by itself, an interrogation frequency of transmission/reception of an interrogation signal that is different from said transmission/reception reference frequency, as a function of a frequency-determining parameter, wherein the frequency-determining parameter is a multiplication factor having a value in a range of 0.7 to 0.9 or in a range of 1.1 to 1.8, delivering the interrogation frequency; and
   after determining the interrogation frequency, the electronic data-acquisition device transmitting the interrogation signal to said data-providing device at the interrogation frequency, said interrogation signal that is transmitted at said interrogation frequency comprising a request for obtaining data from said data-providing device.

2. The method for processing data according to claim 1, wherein the act of determining the interrogation frequency comprises modifying the frequency as a function of the frequency-determining parameter.

3. The method for processing data according to claim 1, wherein the act of determining the interrogation frequency is implemented by a frequency-determining component of the electronic data-acquisition device, said frequency-determining component being under exclusive control of a trusted execution environment (TEE) of said electronic device.

4. The method for processing data according to claim 1, comprising:
   receiving, by a frequency-determining component of the electronic data-acquisition device, a request for obtaining data;
   obtaining, by the frequency-determining component, the frequency-determining parameter;
   determining the transmission/reception frequency of said signal, as a function of the frequency-determining parameter, delivering the interrogation frequency;
   transmitting the interrogation signal to the electronic data-providing device at said interrogation frequency.

5. The method for processing data according to claim 4, furthermore comprising subsequently to transmitting the interrogation signal:
   receiving, from the electronic data-providing device, a response signal sampled at said interrogation frequency;
   obtaining a sequence of bits from said response signal, as a function of said interrogation frequency;
   converting said sequence of bits into a set of data;
   transmitting said set of data.

6. The method for processing data according to claim 4, wherein the act of receiving, by the frequency-determining component of the electronic data-acquisition device, the request for obtaining data, is at least partly implemented by a private applications interface and comprises issuing an application authorization.

7. The method for processing data according to claim 6, wherein the act of issuing an application authorization comprises:
   obtaining at least one of:
      a piece of data representing an applications identifier of the calling application, called an applications identifier; or
      a piece of data representing a calling applications layer, called an applications layer identifier;
   determining an authorization for executing the determining component as a function of at least one of said applications identifier or said applications layer identifier.

8. The method for processing data according to claim 1, wherein the value of said multiplication factor ranges from 1.1 to 1.8.

9. The method for processing data according to claim 1, wherein the value of the multiplication factor is determined randomly, in a range of values from 1.1 to 1.8.

10. The method for processing data according to claim 1, wherein:
   the act of determining frequency is implemented by a frequency-determining component of the electronic data-acquisition device, said frequency-determining component being under exclusive control of a trusted execution environment (TEE) of said electronic device; and
   the value of the multiplication factor is determined by the component for determining upon reception of a request for obtaining data by contactless transfer.

11. An electronic data-acquisition device comprising:
   a processor; and
   a non-transitory computer-readable medium comprising instructions stored thereon which when executed by the processor configure the electronic data acquisition device to:
   obtain data from an electronic data-providing device, the electronic data-acquisition device and electronic data-providing device communicating with each other by using a short-range wireless communications technology defining a transmission/reception reference frequency;
   transmit an interrogation signal to said data-providing device at an interrogation frequency; and
   determine, by the electronic data-acquisition device, itself, an interrogation frequency of transmission/reception of said interrogation signal, different from said transmission/reception reference frequency, as a function of a frequency-determining parameter, the frequency-determining parameter being a multiplication factor having a value in a range of 0.7 and 0.9 or in a range of 1.1 and 1.8, delivering the interrogation frequency, said interrogation signal that is transmitted at said interrogation frequency comprising a request for obtaining data from said data-providing device.

12. A non-transitory computer-readable medium comprising a computer program product stored thereon, which comprises program code instructions for executing a method, when the instructions are executed on a computer of an electronic data-acquisition device, wherein the instructions configure the electronic data-acquisition device to:
   request to obtain data from an electronic data-providing device, the electronic data-acquisition device and the electronic data-providing device communicating with each other by using a short-range wireless communications technology defining a transmission/reception reference frequency, comprising;
   determining, by the electronic data-acquisition device, itself, an interrogation frequency of transmission/reception of an interrogation signal that is different from said transmission/reception reference frequency, as a function of a frequency-determining parameter, the frequency-determining parameter being a multiplication factor having a value in a range of 0.7 and 0.9 or in a range of 1.1 and 1.8, delivering the interrogation frequency; and
   after determining the interrogation frequency, transmitting the interrogation signal to said data-providing device at the interrogation frequency, said interrogation signal that is transmitted at said interrogation frequency comprising a request for obtaining data from said data-providing device.

* * * * *